April 28, 1925.
C. LE G. FORTESCUE
1,535,595
NEGATIVE PHASE SEQUENCE BALANCER FOR POLYPHASE FURNACES
Filed April 13, 1922
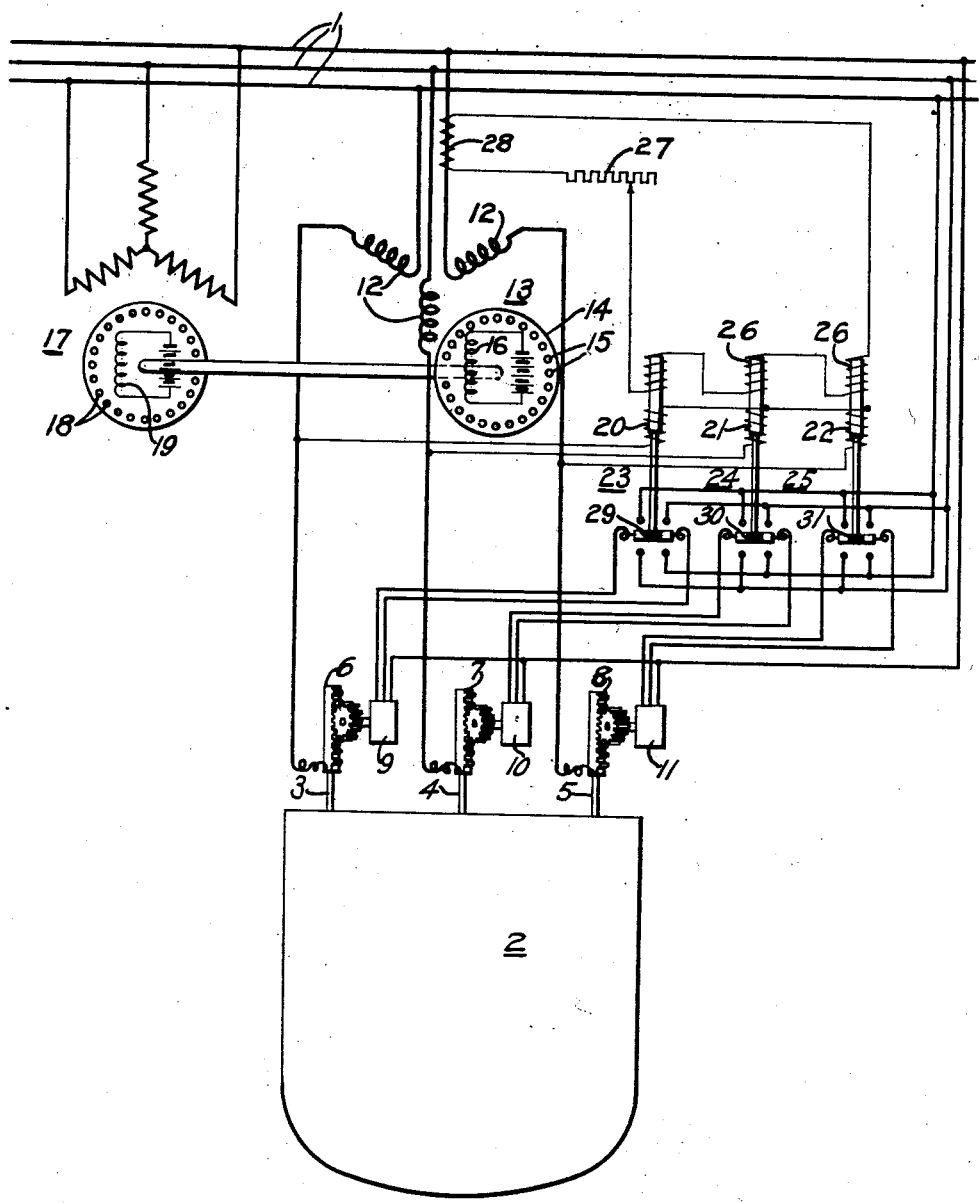
WITNESSES:
INVENTOR
Charles LeG Fortescue
BY
ATTORNEY Patented Apr. 28, 1925.

1,535,595

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

NEGATIVE-PHASE-SEQUENCE BALANCER FOR POLYPHASE FURNACES.

Application filed April 13, 1922. Serial No. 552,244.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Negative-Phase-Sequence Balancers for Polyphase Furnaces, of which the following is a specification.

My invention relates to electric furnaces and it has particular reference to a novel regulating system particularly adapted for polyphase furnaces.

In polyphase electric furnaces, as is well known, it is very difficult to maintain a balanced load on all of the phases. The resultant unbalanced currents, besides producing unequal heating in the furnace, have a very deleterious effect upon the balancing of the polyphase supply lines on account of the unequal impedance drops in the respective supply conductors. In order to overcome the disadvantages just mentioned, I provide my polyphase furnace with a series-connected phase-balancing machine which has a backwardly rotating damper member whereby a synchronous impedance is developed tending to block out the backwardly rotating unbalancing components of current but permitting the substantially unimpeded flow of balanced forward-phase-sequence currents.

Another object of my invention is to provide a polyphase furnace with means for supplying variable voltages to the respective electrodes, as may be necessary to maintain substantially equal currents and to utilize the variations in the resultant voltages applied to the electrodes for controlling the heights of the electrodes.

With these and other objects in view, my invention consists in the features described in the following specification and shown in the accompanying drawing wherein the single figure is a diagrammatic view of circuits and apparatus embodying my invention.

In the drawing is shown a three-phase line 1 supplying a three-phase furnace 2, the latter having three electrodes 3, 4 and 5 which are adjustable in height by means of racks 6, 7 and 8 operated by induction motors 9, 10 and 11.

The electrodes 3, 4 and 5 are connected to the supply circuit through serially-connected primary windings 12 which are wound on the stator member of a series phase balancer 13 having a rotor member 14 carrying good damper windings 15 and a unidirectional exciting winding 16. The rotor member 14 is driven backwardly at synchronous speed by means of an auxiliary machine 17 which is connected to the supply lines 1. The rotor member of the auxiliary machine 17 may be provided with damper windings 18 and a unidirectional exciting winding 19.

The effect of the series balancer 13 is to cause the currents to remain always substantially balanced regardless of the positions of the electrodes, since only substantially balanced currents are transmitted by the machine. The voltages across the respective electrodes, therefore, vary in accordance with the internal impedance of the circuits associated with the respective electrodes.

I, therefore, propose to balance a plurality of voltage-responsive devices across the terminals of the electrodes and to adjust the electrodes either manually or automatically, in order to maintain balanced voltages thereacross, if so desired. In the drawing, I have shown an automatic device comprising three voltage coils 20, 21 and 22 star-connected across the terminals of the electrodes 3, 4 and 5. The coils 20, 21 and 22 comprise the actuating coils of relay devices 23, 24 and 25, respectively, each of said coils pulling against the action of a current coil 26. The current coils are connected in series through a variable resistor 27, across a current transformer 28 in one of the supply leads of the furnace 2.

The relay devices 23, 24 and 25 are provided, respectively, with movable contact members 29, 30 and 31 which are connected to two terminals of the respective regulator motors 9, 10 and 11. The contactor members 29, 30 and 31 are adapted to make contact with either of two pairs of stationary contacts which are connected to two phases of the supply circuit in such manner as to energize the respective regulating motors in the one or the other direction, according as the upper or the lower contacts are engaged. The third phase of the supply line is permanently connected to the remaining terminal of the three motors 9, 10 and 11.

By means of the arrangement just described, the current strength or power may be controlled by adjusting the resistor 27. When the current becomes too large, the relay devices are operated to energize the regulating motors in such direction as to raise the electrodes and, when the voltage across any electrode becomes too large, its corresponding motor is energized in such direction as to lower the electrode, and vice versa.

By the term polyphase electric furnace, I mean to include any aggregation of polyphase or single-phase furnaces which are operated as a single polyphase unit.

While I have described certain characteristics of my invention in detail, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. The combination with a polyphase electric-arc furnace, of a series balancer machine in series therewith, whereby arcs are supplied with equal currents at voltages which vary with the respective resistances.

2. The combination with a polyphase electric-arc furnace, of a series balancer machine in series therewith, whereby arcs are supplied with equal currents at voltages which vary with the respective resistances, and means responsive to said voltages for effecting an adjustment of said resistances.

3. The combination with a polyphase electric device having a plurality of electrodes, of a series balancer machine in series therewith, whereby the electrodes are supplied with substantially equal currents at voltages which vary with the respective resistances of the internal circuits including said electrodes.

4. The combination with a polyphase electric device having a plurality of electrodes, of a series balancer machine in series therewith, whereby the electrodes are supplied with substantially equal currents at voltages which vary with the respective resistances of the internal circuits including said electrodes, and means responsive to said voltages for effecting an adjustment of said resistances.

5. The combination with a polyphase electric device having a plurality of electrodes, of a series balancer machine in series therewith, whereby the electrodes are supplied with substantially equal currents at voltages which vary with the respective resistances of the internal circuits including said electrodes, and means responsive to said voltages for controlling the heights of said electrodes.

6. The combination with a polyphase electric device having a plurality of electrodes, of a series balancer machine in series therewith, whereby the electrodes are supplied with substantially equal currents at voltages which vary with the respective resistances of the internal circuits including said electrodes, means responsive to said voltages for controlling the heights of said electrodes, and current-responsive means for opposing said voltage-responsive means.

7. The combination with a polyphase electric device having a plurality of electrodes, of a series balancer machine in series therewith, whereby the electrodes are supplied with substantially equal currents at voltages which vary with the respective resistances of the internal circuits including said electrodes, means responsive to said voltages for controlling the heights of said electrodes, current-responsive means for opposing said voltage-responsive means, and means for adjusting the value of the current drawn by said polyphase electric device.

8. The combination with a constant-voltage polyphase supply line, of a polyphase electric furnace having adjustable electrodes, and transforming means inherently operative to supply said electrode with variable voltages such as to maintain the respective currents equal.

9. The combination with a constant-voltage polyphase supply line, of a polyphase electric furnace having adjustable electrodes, transforming means inherently operative to supply said electrodes with variable voltages such as to maintain the respective currents equal, and means responsive to said voltages for controlling the heights of said electrodes.

10. The combination with a constant-voltage polyphase supply line, of a polyphase electric furnace having adjustable electrodes, transforming means inherently operative to supply said electrodes with variable voltages such as to maintain the respective currents equal, means responsive to said voltages for controlling the heights of said electrodes, and current-responsive means for opposing said voltage-responsive means.

11. The combination with a constant-voltage polyphase supply line, of a polyphase electric furnace having adjustable electrodes, transforming means inherently operative to supply said electrodes with variable voltages such as to maintain the respective currents equal, means responsive to said voltages for controlling the heights of said electrodes, current-responsive means for opposing said voltage-responsive means, and means for adjusting the value of the current drawn by said furnace.

12. The method of operating a polyphase electric arc mechanism which consists in supplying said mechanism from an inherently operating source of balanced polyphase currents at voltages variable in accordance with the respective impedances of the individual phases of said arc mechanism.

13. The method of operating a polyphase electric device having a plurality of electrodes which consists in supplying said device from an inherently operating source of balanced polyphase currents at voltages variable in accordance with the respective impedances of the internal circuits including said electrodes.

14. The method of operating a polyphase electric furnace having adjustable electrodes which consists in supplying said furnace from an inherently operating source of balanced polyphase currents at voltages variable in accordance with the respective impedances of the individual phases of said furnace.

15. The method of operating a polyphase electric arc mechanism which consists in supplying said mechanism from an inherently operating source of balanced polyphase currents at voltages variable in accordance with the respective impedances of the individual phases of said arc mechanism, and effecting an adjustment of said impedances in accordance with variations in said voltages.

16. The method of operating a polyphase electric device having a plurality of electrodes which consists in supplying said device from an inherently operating source of balanced polyphase currents at voltages variable in accordance with the respective impedances of the internal circuits including said electrodes, and adjusting said electrodes in accordance with variations in said voltages.

17. The method of operating a polyphase electric furnace having adjustable electrodes which consists in supplying said furnace from an inherently operating source of balanced polyphase currents at voltages variable in accordance with the respective impedances of the individual phases of said furnace, and adjusting said electrodes in accordance with variations in said voltages.

18. The combination with a plurality of electric arc mechanisms, of a supply means therefor inherently operative to supply balanced polyphase currents at voltages variable in accordance with the respective resistances.

19. The combination with a polyphase electric device having a plurality of electrodes, of a supply means therefor inherently operative to supply balanced polyphase currents at voltages variable in accordance with the respective resistances of the internal circuits including said electrodes.

20. The combination with a polyphase electric furnace having adjustable electrodes, of a supply means therefor inherently operative to supply balanced polyphase currents at voltages variable in accordance with the respective resistances.

21. The combination with a plurality of electric arc mechanisms, of a supply means therefor operative to supply substantially equal currents at voltages variable in accordance with the respective impedances, and means for indicating a departure of said voltages from a predetermined condition 22. The combination with a polyphase electric device having a plurality of electrodes, of a supply means therefor operative to supply substantially balanced polyphase currents at voltages variable in accordance with the respective impedances, and means for indicating a departure of said voltages from a predetermined condition.

23. The combination with a polyphase electric furnace having adjustable electrodes, of a supply means therefor operative to supply substantially equal currents at voltages variable in accordance with the respective resistances, and means for indicating a departure of said voltages from a predetermined condition.

24. The combination with a polyphase electric device having a plurality of electrodes, of a series balancer machine in series therewith, whereby the electrodes are supplied with substantially equal currents at voltages which vary with the respective resistances of the internal circuits including said electrodes, and means for indicating a departure of said voltages from a predetermined condition.

25. The combination with a polyphase electric furnace, of means for supplying the respective phases thereof with variable currents at variable voltages and for maintaining said currents equal to one another regardless of the average load drawn by the respective phases.

26. The method of operating a polyphase electric furnace which consists in supplying the respective phases thereof with variable currents at variable voltages and adjusting said currents to be equal to one another and to be proportional to the average load drawn by the respective phases.

27. The combination with a polyphase electric device having a plurality of electrodes, of means for supplying the respective electrodes with variable currents at variable voltages, means for causing said currents to be equal to one another at all times, and means for causing said currents to be proportional to the average load drawn by the respective electrodes.

28. The method of operating a polyphase electric device having a plurality of electrodes, which consists in supplying said electrodes with variable polyphase currents which are, at all times, equal in magnitude one to another, regardless of the load.

29. The combination with a balanced polyphase system and a second polyphase system which is subject to momentary unbalancing, of means for interchanging polyphase currents between said systems, means for effecting, at all times, an instantaneous balance for said currents, and means for maintaining an average balance of the voltages in said second system.

30. The combination with a polyphase supply line and a polyphase furnace of the movable-electrode type, of means for maintaining, at all times, an instantaneous balance of the currents drawn by said furnace, and electro-responsive means for adjusting the electrodes to maintain an average balance of the voltages impressed upon said furnace.

31. The method of interchanging power between a balanced polyphase system and a second polyphase system subject to momentary unbalancing, said method consisting in causing the instantaneous values of the interchanged currents to be substantially balanced at every instant, and adjusting the balancing of the voltages in said second system at a slower rate.

32. The method of operating a polyphase furnace which consists in effecting an instantaneous balance for the currents supplied thereto, and so adjusting the furnace impedances as to maintain an average balance for the impressed voltages.

33. The combination with a source of substantially balanced three-phase currents, of three independently variable single-phase paths associated therewith, and means for maintaining the voltages of said paths substantially equal one to another.

34. The combination with a three-phase line, of means for independently regulating the single-phase voltages of the respective delta-phases, and means for maintaining said voltages substantially equal one to another.

35. The combination with a three-phase line, of translating means associated therewith and subject to transient unbalanced energy conditions in the respective phases, means for maintaining the currents in said line substantially balanced at every instant under all conditions of normal energy-unbalance, means for independently regulating the single-phase voltages of the respective three-phase delta terminals of said translating means, and means for maintaining said voltages substantially equal one to another.

36. The method of interchanging substantially balanced energy between three independently variable delta-connected single-phase paths and a balanced three-phase line which consists in causing the interchanged currents to be substantially balanced and maintaining the voltages of said paths substantially equal one to another.

37. The method of balancing a polyphase translating device which consists in independently adjusting the single-phase voltages of the respective delta phases in such manner as to maintain the same substantially equal one to another.

38. The method of interchanging substantially balanced energy between a balanced three-phase line and translating means which are subject to unbalanced energy conditions, said method consisting in maintaining the currents in said line substantially balanced under all conditions of normal energy-unbalance and independently regulating the single-phase voltages of the respective delta-terminals of said translating means in such manner as to maintain said voltages substantially equal one to another.

39. In apparatus for maintaining a predetermined condition of balance in a polyphase electrical quantity, the combination of delta-connected means for deriving a plurality of forces having magnitudes corresponding to the respective single-phase components thereof, and means responsive to a departure of said magnitudes from a condition corresponding to said predetermined condition of balance in said electrical quantity for effecting a compensating regulation of the respective single-phase components.

40. In apparatus for maintaining a balanced condition in a three-phase electrical quantity, the combination of delta-connected means for deriving three forces having magnitudes corresponding to the respective single-phase components of said quantity, and means responsive to a departure of said magnitudes from a condition of equality for effecting a compensating regulation of the respective single-phase components.

41. The method of maintaining a predetermined condition of balance in a polyphase electrical quantity which consists in deriving forces having magnitudes corresponding to the respective single-phase components of delta-connected means responsive to said quantity, and in causing the single-phase components of said quantity to be varied in a predetermined manner in accordance with the relative magnitudes of said forces.

42. The method of maintaining a balanced condition in a three-phase electrical quantity which consists in deriving forces having magnitudes corresponding to the respective single-phase delta components of said quantity and effecting a compensating regulation of the respective single-phase components in such manner as to maintain said magnitudes numerically equal.

43. The method of interchanging substantially balanced energy between a balanced three-phase line and star-connected translating means which are subject to unbalanced energy conditions, said method consisting in maintaining the currents in said line substantially balanced under all conditions of normal energy-unbalance and independently regulating the star components of the respective delta-terminal voltages of said translating means in such manner as to maintain said voltages substantially equal one to another.

44. In apparatus for maintaining a predetermined condition of voltage balance in three phases of a star-connected polyphase apparatus, the combination of three symmetrical star-connected means connected across the delta terminals of said apparatus for deriving a plurality of forces, and means responsive to a departure of said forces from a condition corresponding to said predetermined condition of balance for effecting a compensating regulation of the respective single-phase portions of said apparatus.

45. In apparatus for maintaining a balanced voltage condition in a three-phase star-connected apparatus, the combination of symmetrical star-connected means connected across the delta terminals of said apparatus for deriving three forces, and means responsive to a departure of said forces from a condition of equality for effecting a compensating regulation of the respective single-phase portions of said apparatus.

46. The method of maintaining a predetermined condition of voltage balance in three phases of a star-connected polyphase apparatus which consists in deriving forces having magnitudes corresponding to the respective single-phase components of three symmetrical star-connected means connected across the delta terminals of said apparatus, and causing the single-phase portions of said apparatus to be varied in a predetermined manner in accordance with the relative magnitudes of said forces.

47. The method of maintaining a balanced voltage condition in a three-phase star-connected apparatus which consists in deriving forces having magnitudes corresponding to the respective single-phase voltages between the delta terminals of said apparatus and the center point of the delta triangle, and effecting a compensating regulation of the respective single-phase portions of said apparatus in such manner as to maintain said magnitudes numerically equal.

In testimony whereof, I have hereunto subscribed my name this 11th day of April, 1922.

CHARLES LE G. FORTESCUE.